Figure 1:
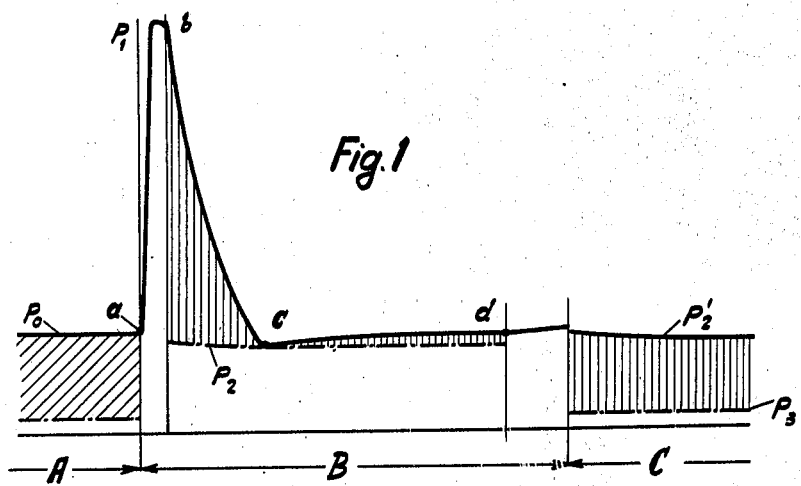

Oct. 31, 1933.  W. G. NOACK  1,933,385
EXPLOSION GAS TURBINE
Filed Jan. 23, 1932   2 Sheets-Sheet 1

Inventor
WALTER G. NOACK
By
Attorney

Oct. 31, 1933.  W. G. NOACK  1,933,385
EXPLOSION GAS TURBINE
Filed Jan. 23, 1932  2 Sheets-Sheet 2

Inventor
WALTER G. NOACK
By
Attorney

Patented Oct. 31, 1933

1,933,385

UNITED STATES PATENT OFFICE 1,933,385

EXPLOSION GAS TURBINE

Walter Gustav Noack, Baden, Switzerland, assignor to Holzwarth Gas Turbine Co., San Francisco, Calif., a corporation of Delaware Application January 23, 1932, Serial No. 588,315, and in Germany October 2, 1930

1 Claim. (Cl. 60—41)

It has already been proposed to construct explosion gas turbines with a plurality of stages, in which the pressure drop from the total explosion pressure down to the air charging pressure, or approximately such pressure, is utilized in a primary stage, which is the actual explosion turbine, the back pressure of the primary stage being approximately equal to the air charging pressure, and the remaining pressure drop is utilized in further stages to which the driving fluid is continuously admitted and which are under approximately constant pressure, the gases expanding in such latter stages down to the atmospheric back pressure. Through this compound effect it becomes possible to increase the total pressure drop as compared with pure (one-stage) explosion turbines and yet maintain high efficiency. The dividing up of the drop, as hitherto practiced, such that the back pressure at the first wheel is made equal or approximately equal to the charging pressure, has the disadvantage, however, that the drops for the first wheel become smaller and smaller towards the end of the discharge from the explosion chamber so that not only does the first wheel perform no more work, but the slowly flowing gas remainder gives rise at the wheel to considerable shock and windage losses. Furthermore, the explosion pressure does not exceed from four to five times the charging pressure and thus the relatively low expansion to a pressure equal to the charging pressure makes it necessary to employ mixtures having a low heat content or greatly to reduce the temperature by cooling the walls, in order not to exceed the first permissible maximum temperatures at the wheel. Therefore, especially when the charging pressure is high, a driving gas results for the second and subsequent stages of the gas turbine, which, while it has a relatively high pressure, has a low power output, being in most cases so low that it hardly provides the compression work expended in compressing the air. Hence, the compound turbine promises a greater success, if the temperature at the first wheel is decreased by increasing the expansion ratio and if in accordance with the invention the back pressure at the first wheel is so chosen that it is substantially lower than the charging pressure, so that the removal of the residual gases, that is of the chamber content expanded down to charging pressure, still takes place with a rather large pressure drop and the pressure drop for the subsequent turbine stages corresponds to the gas temperature prevailing at the first wheel. Now it has already been proposed in the case of single-stage, that is to say, pure explosion turbines having a charging pressure which is higher than the back pressure at the wheel, to increase the explosion cycle frequency by carrying the expansion of the driving gases in the chamber only down to the charging pressure and expelling the residual gases from the chamber with air at charging pressure. While the shortening of the time occupied by a cycle, aimed at by the adoption of this expedient (i. e. the scavenging of the chamber with the air at charging pressure which is to support the next explosion) is thereby realized, the conditions are not yet fulfilled which lead to the economical utilization of the exhaust gas remainder and apply to the subsequent stages of a compound gas turbine. A good efficiency can only be obtained when the ratio ($u/c$) of the peripheral velocity ($u$) of the wheel to the gas velocity ($c$) is such as to correspond to the blading of the turbine. As is well known, optimum $u/c$ conditions are realized when the blade speed is about half of the velocity of the gas discharged by the nozzle (see Moyer, Steam Turbine, John Wiley & Sons, Inc., New York, 1919, page 81).

According to the invention the charging pressure in the chamber and the pressure at the first wheel are to be so selected that the utilization of the exhaust gas remainder at the first wheel and of the total amount of driving gas in the further stages will, owing to the drop due to the pressure difference between charging and back pressure, proceed under good $u/c$ conditions.

Figure 2:
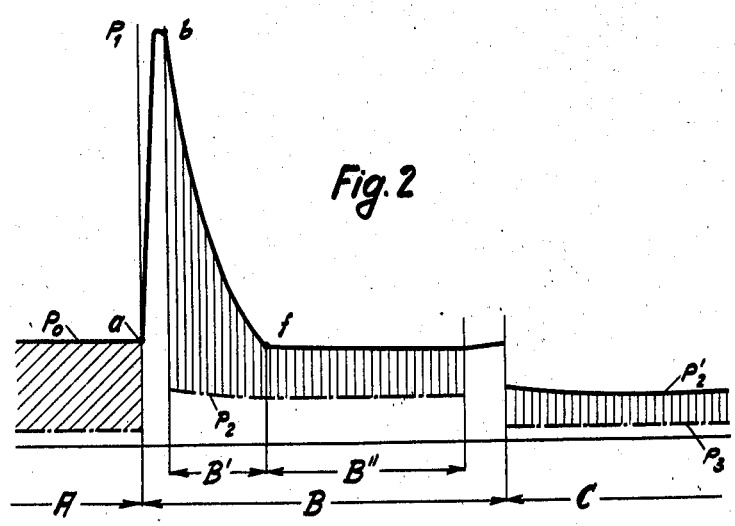
Figure 3:
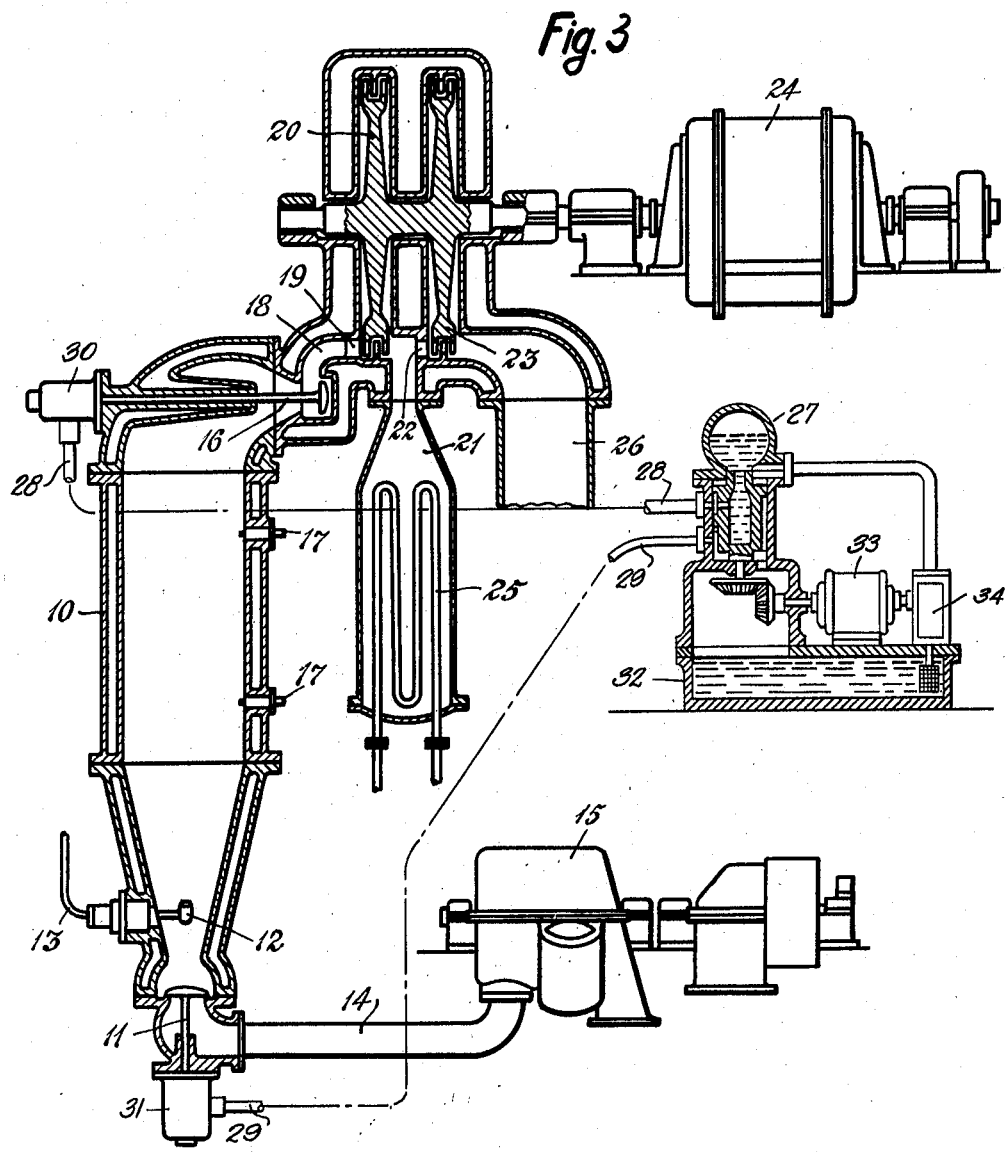

In the accompanying drawings two sets of diagrams are shown, Fig. 1 relating to the known gas turbine which is operated with a comparatively high charging pressure and consists of an explosion turbine section and a continuous flow (constant pressure) turbine section, and Fig. 2 showing the operation of the new gas turbine, while Fig. 3 illustrates diagrammatically an explosion turbine plant embodying the present invention.

A is the pressure-time diagram of the turbocompressor, B the course of the pressure in relation to time during one cycle in a combustion chamber and at the wheel of the explosion turbine, and C the course of the pressure in relation to time in front of the continuous flow (constant pressure) turbine. The compressor compresses the sucked-in air to the pressure $P_0$ and forces it at this pressure into the chambers of the combustion turbine. In the chambers the fuel and air mixture (the fuel is introduced into the chambers in any suitable manner) is ignited at $a$ and reaches the explosion pressure $P_1$. After the known nozzle valve has been opened at $b$, the highly compressed driving gas flows on to the turbine wheel, being expanded down to the pressure $P_2$. This wheel chamber pressure or back pressure of the explosion turbine has usually been kept equal to or only slightly lower than the charging pressure $P_0$. Towards the end of the discharge the drop thus becomes very small, the drop decreasing rapidly from $b$ to $c$, and becoming so small at $c$ and remaining so during the interval $c$—$d$ that the expulsion of the residual gases from the explosion chamber takes place very slowly. The drop available for the performance of work in the continuous flow turbine is $P_2'$—$P_3$, $P_3$ being generally equal to the external atmospheric pressure. The curve $P_2'$ corresponds to the curve $P_2$, and the diagram C should be superimposed on diagram B, the left ends of the two curves falling at the same abscissa, but such diagram C has been shown to the right of diagram B for the sake of clearness.

In Fig. 2, which illustrates the new method of operation, A is again the pressure diagram of the compressor, B the diagram of the explosion turbine and C the diagram of the continuous flow turbine. The working surface of the turbine B consists in this case of two parts, the explosion part B' and a constant pressure part B''. Furthermore, the back pressure $P_2$ at the wheel of the explosion turbine is considerably lower than the charging pressure ($P_0$). As soon, however, as a pressure is reached in the chamber which is equal to this charging pressure (say at $f$), the inlet valve of the combustion chamber opens and the residual gases are pushed out by the incoming air at charging pressure through the nozzle on to the wheel, the chambers being at the same time filled with fresh combustion air. According to the invention the charging pressure $P_0$ and the back pressure $P_2$ are so determined that the heat drop corresponding to this pressure ratio can be utilized at the wheel with good efficiency. Because of the fact that the driving gas is already expanded to a rather low pressure at the first wheel, the drop for the following stages and consequently the utilization of this drop becomes possible with better efficiency in the same number of stages, or at the same efficiency with a smaller number of stages. A special advantage of my improved method of operation is that the windage losses are eliminated, as the wheel, when impinged, is continuously acted upon by work-performing driving gas. As a portion of the constant pressure drop (drop $f$—$P_2$ of the drop $f$—$P_3$ heretofore occurring in the second turbine) is opportioned to the explosion turbine wheel, a greater temperature drop occurs in the nozzles thereof and hence a considerable improvement in the operation of such wheel is realized, as with equal wheel temperatures and equal compression pressures the initial temperature in the combustion chambers may be considerably higher, so that it is possible to work with higher mixture heat contents, and consequently with less excess of air, that is with less expenditure of compression work.

As can be seen from Fig. 2, the back pressure at the first or explosion turbine rotor is, according to the invention, maintained at a considerable pressure below the charging air pressure. The ratio between the charging air pressure to such back pressure is so selected in conformity with known rules and formulae, that the residual gases of the explosion chambers give up part of their energy in the explosion turbine rotor under good $u/c$ conditions, while the pressure of the gases exhausting from the explosion rotor is such that all of the driving gases operate in the subsequent stage or stages likewise under good $u/c$ conditions.

The method of operation above-described may be carried out in an apparatus of the type shown in Fig. 3, wherein the numeral 10 designates a jacketed explosion chamber which is periodically charged with compressed air through an intermittently operated air valve 11 and with fuel through a nozzle 12 fed by a conduit 13, a check valve (not shown) being preferably located in advance of the nozzle 12 to prevent the flow of explosion gases into the conduit 13. A measured quantity of fuel is charged into the nozzle 12 through the conduit 13 at the proper instant in each working cycle by a suitable pump (not shown). The valve 11 controls the flow of air from an air conduit 14 which receives air under pressure from a compressor 15. Upon the formation of a suitable mixture of fuel and air within the chamber, and while the outlet or nozzle valve 16 is closed, the charge is ignited by means of suitable ignition mechanism, such as the spark plugs 17. The explosion gases, which are at a high temperature and pressure, are discharged by the outlet valve 16 into a nozzle conduit 18 which conducts them into an expansion nozzle 19, wherein the gases expand to an intermediate pressure and are directed at high velocity against the Curtis wheel 20. The pressure of the intermittent puffs of gas exhausting from the rotor 20 is equalized by means of a pressure equalizer 21, from which the gases flow in a continuous stream through one or more nozzles 22 against the Curtis wheel 23 which may be mounted upon the same shaft as the Curtis wheel 20. The Curtis wheels 20 and 23 may drive a generator 24 or any other desired apparatus. The temperature of the gases in the equalizer may be reduced by arranging a superheating coil 25 within the same, such coil receiving steam from any suitable source. The completely exhausted gases are discharged through the exhaust pipe 26.

It will be understood that suitable timing mechanism is provided for operating the valves 11 and 16 of the explosion chamber in the proper sequence. Such timing mechanism may take the form of a hydraulic distributor 27 of the type disclosed in United States patent to Holzwarth No. 1,810,768 which alternately feeds oil under pressure through pipes 28 and 29 to the cylinders 30 and 31 of the respective valves, and discharges such pressure oil to a collecting chamber 32. In the cylinders 30 and 31 the oil acts against pistons connected with the stems of the valves to open the latter against the action of springs tending to close the valves. The distributor is driven by a motor 33 which may also drive a pump 34 which returns the oil under pressure to the interior of the distributor 27.

It is to be understood that where hereinabove I speak of charging air under pressure into the explosion chamber of an explosion turbine I mean air of a pressure considerably, i. e. at least one or two atmospheres, above atmospheric, and not merely air at the slight super-atmospheric pressure necessary for insuring its proper flow.

I claim:

A compound constant volume explosion gas turbine plant comprising a constant volume explosion chamber, a first rotor, a nozzle for directing the gases discharging from said explosion chamber to said rotor, a second rotor, an exhaust chamber between said rotors, a nozzle for directing the gases from said exhaust chamber against said second rotor, said exhaust chamber being under a pressure above atmospheric during the operation of the plant, an outlet valve for said explosion chamber, an air inlet valve for charging scavenging air into said explosion chamber, and means for delivering to said air valve air of such a pressure above the pressure in the exhaust chamber that the pressure drop is capable of producing a flow velocity equal to at least twice the peripheral velocity of the first turbine, said air valve being opened, following the explosion of a charge in the explosion chamber, when the gas pressure in the explosion chamber has fallen to approximately the pressure of the scavenging air, so that the residual gases in the explosion chamber are expelled at a pressure substantially equal to that of the scavenging air and are therefore capable of acquiring, in the first mentioned nozzle, a velocity which is equal to at least twice the peripheral velocity of the first turbine.

WALTER GUSTAV NOACK.